May 23, 1933.  C. SPAETH  1,910,071
DISPENSING APPARATUS
Filed Dec. 2, 1931  2 Sheets-Sheet 1
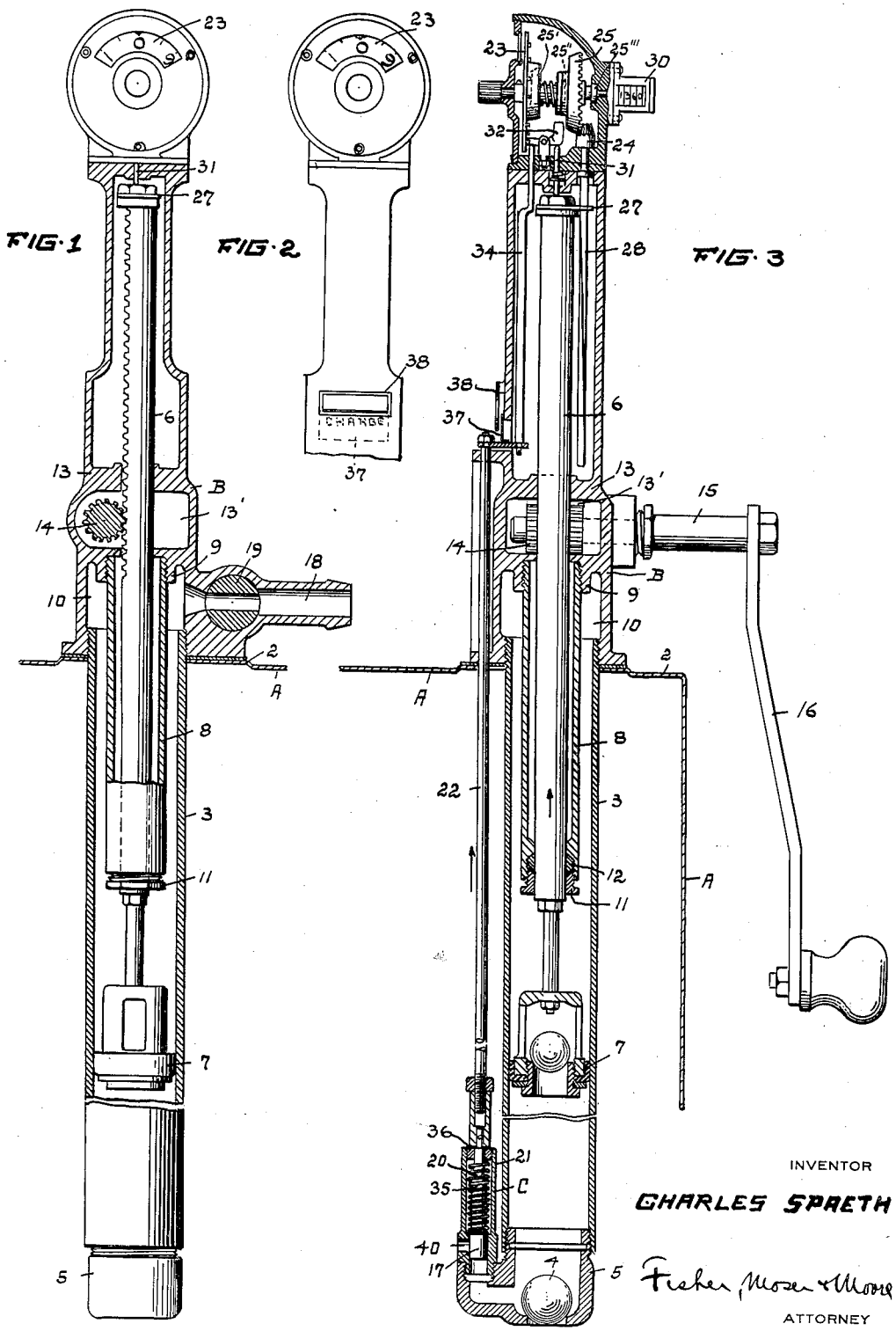
INVENTOR
CHARLES SPAETH
Fisher, Moser & Moore
ATTORNEY

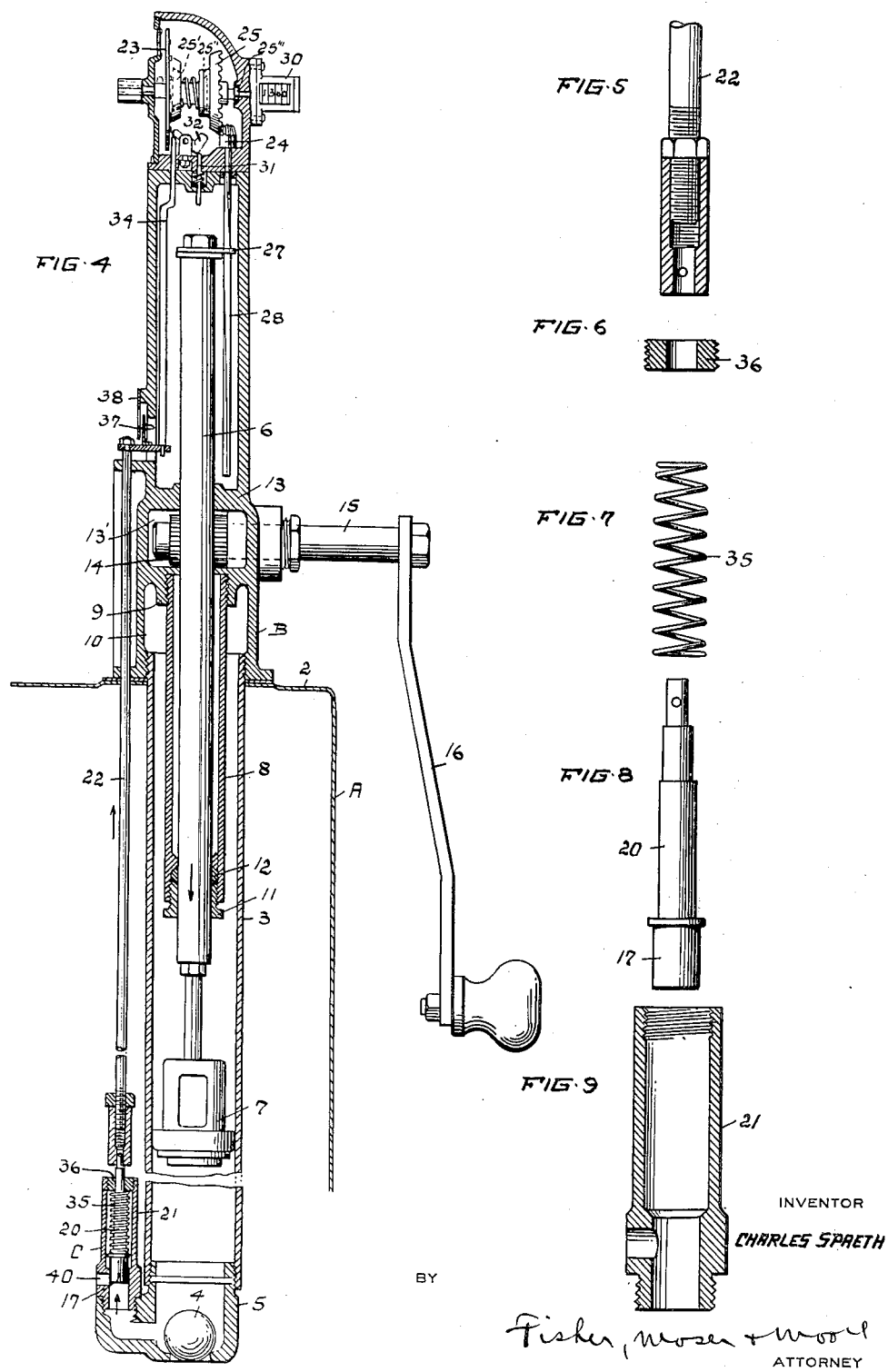

Patented May 23, 1933

1,910,071

UNITED STATES PATENT OFFICE

CHARLES SPAETH, OF CLEVELAND, OHIO

DISPENSING APPARATUS

Application filed December 2, 1931. Serial No. 578,492.

This invention relates to dispensing apparatus, and more particularly to a reciprocable pumping apparatus for dispensing measured charges of oil, grease, liquid, or semi-liquid substances and is an improvement of a dispensing apparatus such as described and shown in my co-pending patent application, Serial No. 445,900, filed April 21, 1930. In general, the object is to provide a dispensing apparatus which will effect correct measurement, eliminate error, indicate to the operator and customer when correct measure is not dispensed, especially indicate when the tank is empty, and to register and plainly indicate at the pump the total amount of lubricant being delivered to a customer, thus safeguarding the purchaser from deception and fraud in dispensing operations.

In dispensing devices which deliver grease or oil from an invisible supply through a flexible hose, having a delivery nozzle or spout, into a closed receiving vessel, such as a gear housing, transmission case, or the like, the purchaser has no means of knowing the exact amount of the charge delivered. The present apparatus has been especially designed to indicate the exact charge and to prevent fraud. Thus, a charge of lubricant is drawn into an oversized measuring chamber and thereafter placed under more or less compression to assure a correct charge preliminary to dispensing same. Provision is made for by-passing or returning the lubricant in excess of the correct charge to the supply receptacle, and a loading or charging indicator is provided which is operatively dependent upon the pressure conditions in the pump, so that purchaser and attendant may determine whether the pump has been accurately charged, and be advised when the tank or container is empty and the supply depleted or exhausted.

Furthermore, the present pump includes means for indicating the amount of lubricant delivered during each individual sale or dispensing operation, and a counter device registering the total amount of lubricant dispensed is also embodied therein. The two indicating and counting devices are actuated automatically by the reciprocating plunger of the pump, which respectively controls the customer's indicator and the counter device.

The customer's indicator is resettable but as it is desirable to make it impossible to reset the indicator until the pump is fully charged, special mechanism is provided for automatically locking such indicator preliminary to charging or filling the pump, and thereafter when the pump is fully charged to unlock the indicator so that inadequate filling of the pump causes the indicator to remain locked. The controlling means for by-passing any surplus amount of lubricant over and above the predetermined charge and for the loading or charging indicator as well as for the rotatable customer's indicator, consists according to the present invention of a pressure operated device. Thus, the device is arranged close to the lower end of the dispensing apparatus, at a place where the attendant cannot fraudulently manipulate the same, all as hereinafter more fully described in the following description of the exemplified form of dispensing apparatus shown in the drawings forming part of this description.

In these drawings, Fig. 1 is a sectional view of a lubricant dispensing apparatus embodying my improvement. Fig. 2 is a fragmentary side elevation of the pump of Fig. 1 showing the shiftable loading or charging indicator. Fig. 3 is a sectional view on line 3—3 of Fig. 1 and Fig. 4 a sectional view corresponding to Fig. 3 showing the pump piston moving downwardly to place the charge under compression and to by-pass the lubricant in excess of the correct charge. Figs. 5 through 9 are sectional and side views of the disassembled parts of the pressure indicator operating means and the by-pass means, thus Fig. 5 is a sectional view of the adjustable coupling members between the pressure operated plunger and the connecting rod for the pressure indicator; Fig. 6 is a sectional view of the backing nut for the spring shown in Fig. 7; Fig. 8 a side view of the pressure operated plunger; and Fig. 9 a sectional view of the body of the pressure indicator operating means and by-pass means.

The apparatus comprises a tank or receptacle A of any suitable character adapted to hold a supply of the lubricant to be dispensed. A pump body B is affixed to a cover 2 for this receptacle, and a cylindrical barrel or tube 3 is connected to the bottom of the pump body and extends downwardly into the receptacle nearly to its bottom, where an L-shaped extension 5, threadedly connected with said tube, is provided with a check valve 4. A toothed rack member 6 carrying a plunger or piston 7 is reciprocably confined within the barrel or tube 3, and this rack member is supported to slide within a smaller and shorter tube 8 which is threadedly connected at its upper end to an internal boss 9 within the receiving chamber 10 of pump body B. A nut 11 and packing ring 12 at the lower end of pipe 8 provides a closure member for the pipe and a bearing for the lower end of rack member 6.

The upper end of this rack member extends through a second bearing wall 13 in the pump body above a transverse bore or recess 13' housing a pinion 14, integral with a rotatable shaft 15, having a crank handle 16. The piston may be reciprocated manually by the means described for drawing charge of lubricant into the cylinder upon a full stroke of plunger. This charge is transferred from the lower end of the cylinder to the upper end thereof and also into the hollow bottom of the pump body upon the reverse or down stroke of plunger. To insure that the amount of lubricant transferred from the lower to the upper part of the pump cylinder upon the downward stroke of the piston represents full measure, such amount is preferably in excess of the correct measure, the surplus being returned or fed back into the tank or receptacle A by way of a by-pass passage 40 in extension 5 of tube 3. To this end passage 40 is controlled by a spring-pressed valve 17 adjusted to open under a predetermined pressure during the down stroke of the piston, when the discharge outlet 18 of the pump body A is closed by rotatable valve 19. During this interval a piston 20 carrying valve 17, confined within the cylindrical body portion 21 of the operating means C is exposed to the charge of lubricant under pressure within the pump cylinder. Accordingly, this small piston is moved upwardly against the pressure of spring 35 when a predetermined pressure condition is reached within the cylinder 3, thereby raising an upright member or rod 22, fixed to the upper protruding end of piston 20. The upward movement of piston 20 occurs only when a full charge of lubricant is present in the pump cylinder 3. The upward movement of rod 20 is utilized to unlock or permit of the rotatable movement of an indicating dial 23 mounted upon the upper end of hollow body B. Dial 23 informs the purchaser and operator as to the accuracy of the amount of lubricant dispensed. Moreover, the dial will stay locked whenever the supply is inadequate or exhausted, thus indicating when the pump is or is not dispensing a lubricant, all as more specifically described and brought out in my copending application, Serial No. 494,460 filed November 10, 1930.

Thus, dial 23 is rotated automatically in one direction by a train of clutch controlled driving means 24, 25 which are operatively dependant upon the reciprocable movement of the pump piston 7 and its operating rack member 6. As shown, a perforated plate 27 is fixed to the upper end of rack member 6 to slidably engage and rotate a flat-sided twisted bar or spiral shaft 28 whenever the crank handle is turned to operate. Shaft 28 extends into the hollow upper end of body 2 closely adjacent and parallel to rack member 6, and is square in cross section to fit the opening in plate 27 through which it extends. Driving member 24, in the form of a beveled pinion gear, is secured to the upper end of shaft 28 and meshes with a larger driving bevel gear 25 and drives either the indicating dial 23 or a recording device, such as a Veeder counter 30. Rotation of shaft 28 in clock-wise direction during the upward stroke of rack bar 6 causes the indicating dial 23 to turn, whereas rotation of anti-clockwise direction affects rotation of the Veeder counter 30, a series of clutches 25', 25'', and 25''' being provided to permit of automatic selective rotation of the indicating dial and the Veeder counter.

Upon each up stroke of the pump piston a charge is dispensed and the indicating dial 23 is rotated in an anti-clockwise direction by gear 25. Locking of the dial is effected at the end of the dispensing stroke, while unlocking of the dial takes place when the piston and rack bar are lowered, providing the pump cylinder contains a full charge. During the up stroke of the pump piston and its rack member 6, the latter engages a short pin 31, shortly before the end of its stroke is reached, and forces this pin upwardly against one end of a pivoted locking dog or pawl 32, thus tilting this dog into wedging engagement with dial 23. To unlock dial 23 dog or pawl 32 is tilted in reverse direction, such tilting movement being effected through a push rod 34, connected to the pressure controlled piston 20 and extending upwardly through hollow body B into engagement with the locking end of the dog or pawl 32. In operation, rod 34 and piston 20 are raised only when a full charge of lubricant is present within the pump and a predetermined pressure exists, as controlled by the pressure by-pass valve 17 forming part of piston 20.

The pressure controlled piston 20 is held by the compression spring 35 from moving upwardly except under given pressure conditions. Thus, the tension of spring 35 may be adjusted by a nut 36 screw-engaged with body 21 of operating device C to permit uplift of piston 20 only when a predetermined pressure exists within pump cylinder 3. When delivering lubricant piston 20 is always down thereby keepng an indicator plate 37 out of sight behind a slotted screen 38 (see Fig. 2). This plate 37 is connected with the upper end of rod 22 and bears a suitable inscription such as "charge" to show that the pump cylinder is fully charged and the apparatus is in working condition to deliver correct measure. In case of excess pressure being developed while transferring the charge from the lower part of cylinder 3 into the upper part thereof and into the hollow bottom of the pump body, piston 20 is elevated to a greater degree thus opening the by-pass valve opening 40 and permitting the surplus charge to be by-passed back into the tank or receptacle A.

What I claim, is:

1. In an apparatus for dispensing predetermined quantities of fluid, a chamber having a volumetric capacity in excess of the amount of fluid to be dispensed, a valve controlled discharged passage and a by-pass passage for said chamber, means to deliver a charge into said chamber, means to decrease the volumetric capacity of said chamber and by-pass any excess of fluid in said charge over and above the predetermined quantity to be dispensed, a rotatable indicator for indicating the dispensed quantities, means for locking said indicator when fluid is not being dispensed, and a single pressure actuated means controlling said locking means and said by-pass for unlocking said indicator and by-passing any fluid in excess of the quantity of fluid to be dispensed.

2. In an apparatus for dispensing predetermined quantities of fluid, a chamber having a volumetric capacity in excess of the amount of fluid to be dispensed, a valve controlled discharge passage at one end and a by-pass passage at the other end of said chamber, means to deliver a charge into said chamber, means to decrease the volumetric capacity of said chamber and by-pass any excess of fluid in said charge over and above the predetermined quantity to be dispensed, a rotatable indicator for the dispensed quantity, means for locking said indicator when fluid is not being dispensed, means for indicating when said chamber is fully charged, and a single pressure actuated means controlling said locking means, said by-pass and said indicating means for unlocking said indicator, by-passing any fluid in excess of the quantity of fluid to be dispensed and indicating that a full charge has been taken.

3. In an apparatus for dispensing predetermined quantities of fluid, a chamber having a volumetric capacity in excess of the amount of fluid to be dispensed, a valve controlled discharge passage and a by-pass passage for said chamber, means to deliver a charge into said chamber, means to decrease the volumetric capacity of said chamber and by-pass any excess of fluid in said charge over and above the predetermined quantity to be dispensed, a rotatable indicator for indicating the dispensed quantities, means for locking said indicator when fluid is not to be dispensed, and a pressure operated spring-actuated valve for said by-pass passage including an extension adapted to unlock said locking means for said rotatable indicator prior to the opening of said by-pass passage by said pressure operated valve.

4. In an apparatus for dispensing predetermined quantities of fluid according to claim 1, an L-shaped extension at the lower end of said chamber including said by-pass passage, a reciprocable plunger within said extension controlling said by-pass passage, a spring tending to force said plunger downwardly to close said by-pass passage, and an extension on said plunger actuating upon said locking means for said rotatable indicator to unlock said locking means prior to the opening of said by-pass passage.

In testimony whereof I affix my signature.

CHARLES SPAETH.